Patented June 11, 1935

2,004,764

UNITED STATES PATENT OFFICE 2,004,764

PREPARATION OF N(p-AMINO-PHENYL) MORPHOLINE

Herbert A. Lubs and George Clifford Strouse, Wilmington, Del., assignors to E. I. du Pont de Nemours & Company, Wilmington, Del., a corporation of Delaware No Drawing. Application June 14, 1932, Serial No. 617,244

15 Claims. (Cl. 260—28)

This invention relates to a new method of producing N(p-amino-phenyl) morpholine.

In copending application of H. A. Lubs, Serial No. 616,745, there is described a new organic compound, N(p-amino-phenyl) morpholine, prepared by the reduction of N(p-nitroso-phenyl) morpholine and/or N(p-nitro-phenyl) morpholine by means of a metal such as zinc or iron in an acid medium.

An object of the present invention is to provide a new and improved method of preparing N(p-amino-phenyl) morpholine. A further object is to provide a method of reducing N(p-nitroso-phenyl) morpholine and/or N(p-nitro-phenyl) morpholine to N(p-amino-phenyl) morpholine, which method can be satisfactorily and economically practiced. Other objects will appear hereinafter.

These objects may be accomplished according to the present invention which comprises treating a solution of N(p-nitroso-phenyl) morpholine or N(p-nitro-phenyl) morpholine with a water soluble inorganic sulfide having reducing properties to form N(p-amino-phenyl) morpholine.

In order to more fully illustrate our invention and the preferred mode of carrying the same into effect the following examples are given:

*Example 1.*—560 parts of a 20% solution of sodium hydrogen sulfide are cooled to about 0° C to −10° C. and 20 parts of ammonium chloride are added. 205 parts of N(p-nitroso-phenyl) morpholine hydrochloride are then added to the cooled sulfide solution with good agitation, meanwhile maintaining the temperature below 0° C. After all of the nitroso-phenyl-morpholine has been added the temperature of the mixture is allowed to rise and the mixture is finally heated to boiling until the reduction is complete. Hydrochloric acid is then added until the solution is acid to Congo red. The acidified solution is boiled for a few minutes and is then filtered and cooled to about 20° C. Caustic soda is then added to the cooled acid solution until the solution is alkaline to phenolphthalein, thereby precipitating the amino-phenyl-morpholine. The N(p-amino-phenyl) morpholine is then filtered off from the cooled solution. It may be purified by recrystallizing from water.

*Example 2.*—114 grams N(p-nitroso-phenyl) morpholine hydrochloride is added to a solution of 68 grams of ammonium sulfide in 300 cc. of water, with good agitation. The temperature of the solution is maintained below 30° C. until all of the nitroso-phenyl-morpholine has been added. The temperature of the mixture is then allowed to rise and the mixture finally heated to 90° C. for about 5 minutes. After cooling the mixture to 70° C., hydrochloric acid is added until the mixture is acid to Congo red. The acidified solution is then filtered and cooled to about 20° C. or lower. The amino-phenyl-morpholine may be precipitated by adding caustic soda until the solution is alkaline to phenolphthalein. The N(p-amino-phenyl) morpholine may then be recovered by filtration of the cooled mixture.

*Example 3.*—100 grams of sodium sulfide crystals are dissolved in 300 cc. of water. The resulting solution is cooled to 15° C. or lower and 57 grams of N(p-nitroso-phenyl) morpholine hydrochloride added, with good agitation. After holding the temperature at 15° C. for about one hour, the charge is diluted to 600 cc. and heated to boiling. 5 grams of decolorizing carbon are then added to the charge which is filtered while hot. Upon cooling, N(p-amino-phenyl) morpholine separates from the filtrate and may be removed by filtration.

By carrying out the reduction of N(p-nitroso-phenyl) morpholine by the methods above described, higher yields of N(p-amino-phenyl) morpholine may be obtained more readily and at a lesser cost. N(p-nitro-phenyl) morpholine may be reduced likewise.

Hydrogen sulfide and the polysulfides may be employed in place of the sulfides employed in the above examples. In fact, any water soluble inorganic sulfide which has reducing properties in water may be used. However, the sulfides of the alkalies (sodium, ammonium and potassium) are preferred.

While we have disclosed specific methods of carrying out the reduction employing particular reagents, in particular proportions, it will be apparent to those skilled in the art that many changes and modifications in the method may be made without departing from the spirit of our invention. Accordingly, the scope of our invention is to be limited solely by the appended claims construed as broadly as is permissible in view of the prior art.

We claim:

1. The method of preparing N(p-amino-phenyl) morpholine which comprises adding N(p-nitroso-phenyl) morpholine hydrochloride to an aqueous solution of a sulfide of an alkali metal.

2. The method of preparing N(p-amino-phenyl) morpholine which comprises adding N(p-nitroso-phenyl) morpholine hydrochloride to an aqueous solution of a sulfide of an alkali and subsequently heating until the reaction is complete.

3. The method of preparing N(p-amino-phenyl) morpholine which comprises adding N(p-nitroso-phenyl) morpholine hydrochloride to an aqueous solution of a sulfide of an alkali, subsequently heating until reduction is complete, acidifying with hydrochloric acid, filtering, and then rendering the filtrate alkaline to precipitate the N(p-amino-phenyl) morpholine.

4. The method of preparing N(p-amino-phenyl) morpholine which comprises adding N(p-nitroso-phenyl) morpholine hydrochloride to an aqueous solution of a sulfide of an alkali and ammonium chloride, subsequently heating until reduction is complete, acidifying, filtering, and then rendering the filtrate alkaline to precipitate the N(p-amino-phenyl) morpholine.

5. The method of preparing N(p-amino-phenyl) morpholine which comprises adding N(p-nitroso-phenyl) morpholine hydrochloride to an aqueous solution of sodium hydrogen sulfide and ammonium chloride, subsequently heating until reduction is complete, acidifying, filtering, and then rendering the filtrate alkaline to precipitate the N(p-amino-phenyl) morpholine.

6. The method of preparing N(p-amino-phenyl) morpholine which comprises adding N(p-nitroso-phenyl) morpholine hydrochloride to an aqueous solution of sodium sulfide and subsequently heating until the reaction is complete.

7. The method of preparing N(p-amino-phenyl) morpholine which comprises adding N(p-nitroso-phenyl) morpholine hydrochloride to an aqueous solution of sodium sulfide, subsequently heating until reduction is complete, acidifying, filtering, and then rendering the filtrate alkaline to precipitate the N(p-amino-phenyl) morpholine.

8. The method of preparing N(p-amino-phenyl) morpholine which comprises adding N(p-nitroso-phenyl) morpholine hydrochloride to an aqueous solution of ammonium sulfide and subsequently heating until the reaction is complete.

9. The method of preparing N(p-amino-phenyl) morpholine which comprises adding N(p-nitroso-phenyl) morpholine hydrochloride to an aqueous solution of ammonium sulfide, subsequently heating until reduction is complete, acidifying, filtering, and then rendering the filtrate alkaline to precipitate the N(p-amino-phenyl) morpholine.

10. The method of preparing N(p-amino-phenyl) morpholine which comprises reducing a member of the group consisting of N(p-nitroso-phenyl) morpholine hydrochloride and N(p-nitro-phenyl) morpholine hydrochloride by means of an inorganic water soluble sulfide having reducing properties.

11. The method of preparing N(p-amino-phenyl) morpholine which comprises adding a member of the group consisting of N(p-nitroso-phenyl) morpholine hydrochloride and N(p-nitro-phenyl) morpholine hydrochloride to an aqueous solution of a sulfide of an alkali and subsequently heating until the reaction is complete.

12. The method of preparing N(p-amino-phenyl) morpholine which comprises adding a member of the group consisting of N(p-nitroso-phenyl) morpholine hydrochloride and N(p-nitro-phenyl) morpholine hydrochloride to an aqueous solution of a sulfide of an alkali and ammonium chloride and subsequently heating until the reaction is complete.

13. The method of preparing N(p-amino-phenyl) morpholine which comprises adding a member of the group consisting of N(p-nitroso-phenyl) morpholine hydrochloride and N(p-nitro-phenyl) morpholine hydrochloride to an aqueous solution of sodium hydrogen sulfide and ammonium chloride and subsequently heating until the reaction is complete.

14. The method of preparing N(p-amino-phenyl) morpholine which comprises adding a member of the group consisting of N(p-nitroso-phenyl) morpholine hydrochloride and N(p-nitro-phenyl) morpholine hydrochloride to an aqueous solution of sodium sulfide and subsequently heating until the reaction is complete.

15. The method of preparing N(p-amino-phenyl) morpholine which comprises adding a member of the group consisting of N(p-nitroso-phenyl) morpholine hydrochloride and N(p-nitro-phenyl) morpholine hydrochloride to an aqueous solution of ammonium sulfide and subsequently heating until the reaction is complete.

HERBERT A. LUBS.
GEORGE CLIFFORD STROUSE.